United States Patent [19]

Igari

[11] Patent Number: 5,758,755
[45] Date of Patent: Jun. 2, 1998

[54] SPRAG TYPE ONE-WAY CLUTCH

[75] Inventor: Kozaburo Igari, Shizuoka-ken, Japan

[73] Assignee: NSK-Warner K.K., Tokyo, Japan

[21] Appl. No.: 670,651

[22] Filed: Jun. 26, 1996

[30] Foreign Application Priority Data

Jun. 30, 1995 [JP] Japan ................... 7-165613

[51] Int. Cl.$^6$ ........................................ F16D 41/07
[52] U.S. Cl. ........................... 192/45.1; 192/41 A
[58] Field of Search ............................ 192/45.1, 41 A; 188/82.8

[56] References Cited

U.S. PATENT DOCUMENTS

| | | | |
|---|---|---|---|
| 2,683,510 | 7/1954 | Troendly | 192/45.1 |
| 2,806,566 | 9/1957 | Szady et al. | 192/45.1 |
| 2,932,989 | 4/1960 | Winchell | 192/45.1 X |
| 4,347,921 | 9/1982 | Bordes | 192/41 A |
| 5,038,903 | 8/1991 | Akagi et al. | 192/41 A |
| 5,070,976 | 12/1991 | Zlotek | 192/45.1 |

Primary Examiner—Richard M. Lorence
Attorney, Agent, or Firm—Shapiro and Shapiro

[57] ABSTRACT

A sprag type one-way clutch comprises an outer race having an inner peripheral raceway surface and an inner race disposed within the outer race and having an annular outer peripheral raceway surface, the outer race and the inner race being radially spaced apart from each other and concentrically disposed for relative rotation, a plurality of sprags disposed between the outer race and inner race for transmitting a torque between the outer peripheral raceway surface and the inner peripheral raceway surface, an annular retainer retaining the sprags, and a spring member holding the sprags between itself and the retainer and biasing the sprags in a meshing direction, and is characterized in that the retainer is provided with a cylinder portion having a radially extending window portion, the sprags are fitted in the window portion for pivotal movement, and the spring member is guided in a substantially circular form by the outer peripheral surface of the cylinder portion.

5 Claims, 3 Drawing Sheets

SPRAG TYPE ONE-WAY CLUTCH

BACKGROUND OF THE INVENTION

1. Field of the Invention

This invention relates to a one-way clutch used as a part, for torque transmission or back stop, for example, in the drive device of an automobile, a two-wheeled vehicle, an industrial machine or the like, and more particularly to a sprag type one-way clutch having a reduced number of parts.

2. Related Background Art

Generally, a sprag type one-way clutch provided with a sprag functioning as a cam, as shown in FIGS. 5 and 6 of the accompanying drawings, comprises an annular wire cage 60, a plurality of sprags 20 held by the wire cage, an annular spring 30 engaged with grooves formed in the sprags 20 and holding the sprags 20 between itself and the wire cage 30, and two side plates 40 and 50 holding the sprags 20 between the axial opposite ends thereof.

An inner race is fitted to the inside of the wire cage 60, and the outer peripheral surface of the inner race is in contact with the inner sides of the sprags 20. Also, an outer race is fitted to the outside of the wire cage so as to contact with the outer sides of the sprags 20. As a result, the transmission of a torque is effected between the inner and outer races through the sprags 20. In FIGS. 5 and 6, the inner race and the outer race are not shown. In such a sprag type one-way clutch according to the prior art, the number of parts is great and recent strict requirements in terms of manufacture and cost could not be satified.

If in order to meet such requirements, for example, the number of sprags is decreased, the guiding property of the spring will become bad. More particularly, grooves in the sprags provide a guide for the spring, it will become difficult to keep the entire spring in a circular state. As a result, there will be the possibility that a sufficient biasing force in a meshing direction which acts on the sprags is not obtained. In this case, there arises the problem that the meshing engagement between the outer peripheral surface of the inner race and the sprags and between the inner peripheral surface of the outer race and the sprags becomes bad and also the durability of the spring is spoiled.

SUMMARY OF THE INVENTION

Accordingly, it is an object of the present invention to provide a sprag type one-way clutch in which the number of parts can be decreased as compared with the prior art, the guiding property of a spring holding sprags between it and a retainer can be improved, the meshing engagement between the outer peripheral surface of an inner race and the sprag and between the inner peripheral surface of an outer race and sprags becomes reliable, also the durability of the spring is not spoiled.

To achieve the above object, the sprag type one-way clutch of the present invention may comprise an outer race having an inner peripheral raceway surface and an inner race disposed within the outer race and having an annular outer peripheral raceway surface, the outer race and the inner race being radially spaced apart from each other and concentrically disposed for relative rotation, a plurality of sprags disposed between the outer race and the inner race for transmitting a torque between the outer peripheral raceway surface and the inner peripheral raceway surface, an annular retainer retaining the sprags, and a spring member holding the sprags between itself and the retainer and biasing the sprags in a meshing direction, characterized in that the retainer is provided with a cylinder portion having a radially extending window portion, the sprags are fitted in the window portion, and the spring member is guided in a substantially circular form by the outer peripheral surface of the cylinder portion.

According to the present invention, the retainer functions as side plates and the same wire cage at a time and therefore, the number of parts can be decreased. Also, the spring can be guided by the cylinder portion of the retainer, and therefore, the circularity of the spring is improved and reduction in the basing force thereof does not result. Thus, the meshing engagement of the sprags becomes reliable and the durability of the spring is also improved.

DESCRIPTION OF THE PREFERRED EMBODIMENT

Figure 1:
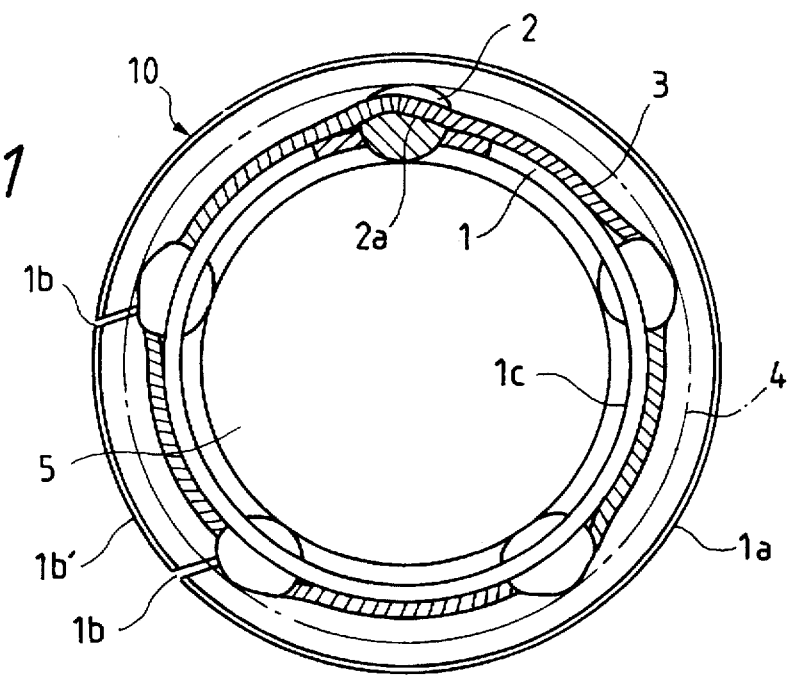
FIG. 1 is an axial front view of a sprag type one-way clutch according to an embodiment of the present invention.

The invention will hereinafter be described in detail with reference to the drawings. Of course, the embodiments which will hereinafter be described are illustrative of the present invention and does not restrict the present invention. Throughout the drawings, like portions are designated by like reference characters.

FIG. 1 is a front view of a sprag type one-way clutch 10 according to an embodiment of the present invention as it is seen from the axial direction thereof.

The sprag type one-way clutch 10 is provided with an outer race 4 indicated by a phantom line, and an inner race 5 disposed concentrically with the outer race 4, a plurality of sprags 2 disposed between the outer peripheral raceway surface of the inner race 5 and the inner peripheral raceway surface of the outer race 4, an annular retainer 1 holding the sprags 2 equidistantly in the circumference thereof, and a spring 3 holding the sprags 2 between itself and the retainer 1.

Figure 2:
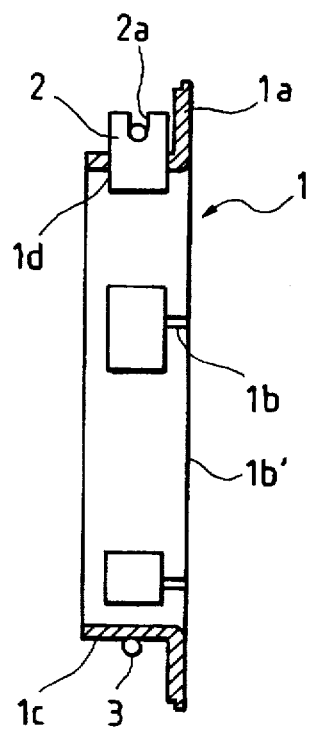
FIG. 2 is a radial cross-sectional view of the sprag type one-way clutch of FIG. 1 with an outer race and an inner race omitted.

As is apparent from FIG. 2, the retainer 1 is provided with a cylinder portion 1c, and an annular flange portion 1a integrally and radially outwardly extending from an axial end of the cylinder portion 1c. The cylinder portion 1c is provided with window portions 1d radially extending therethrough at predetermined positions equidistant in the circumferential direction thereof, and the sprags 2 are fitted in window portions 1d.

The flange portion 1a of the retainer 1 is formed with two cut-aways 1b cut in from the radial edge portion thereof to the cylinder portion 1c. A portion 1b' sandwiched between the cut-aways 1b of the flange portion 1a is outwardly offset so as to be in contact with the outer race 4 to thereby prevent the rotation of the retainer 1 relative to the outer race 4.

As shown in FIG. 2, each sprag 2 is formed with a groove 2a formed therethrough in the circumferential direction on the cam surface 2b (see FIGS. 3 and 4) side thereof, and the spring 3 is guided and mounted in these grooves 2a. The spring 3 is of a continuous annular close contact coil type, and at the other locations than the grooves 2a of the sprags 2, it holds the sprags 2 between itself and the retainer 1 while being guided and held by the outer peripheral surface of the cylinder portion 1c of the retainer 1. As described above, the spring 3 holding the sprags 2 is guided also by the outer peripheral surface of the cylinder portion 1c of the retainer 1 and therefore, the circularity of the spring 3 can be improved, and the guiding property of the spring 3 is improved.

That is, the cylinder portion 1c of the retainer 1 and the grooves 2a of the sprags 2 guide the spring 3 and therefore, even when the number of the sprags 2 is increased or decreased to set a necessary torque capacity arbitrarily, the spring 3 is always in a circular state and the one-way clutch 10 can secure reliable meshing performance. It is also possible to use any other spring than a coil spring as the spring 3.

Figure 3:
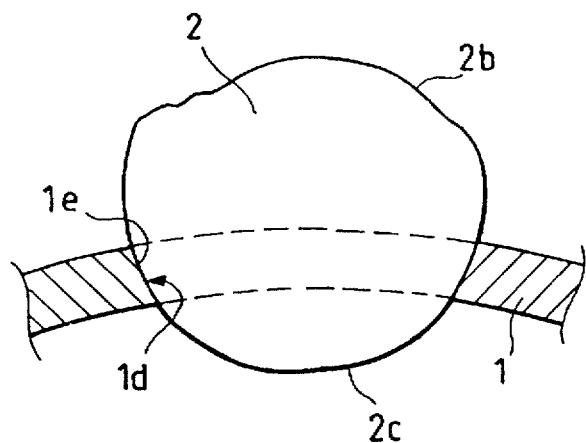
FIG. 3 is a cross-sectional view showing a first example of the shape of the window portion of a retainer applicable to the embodiment of FIG. 1.
Figure 4:
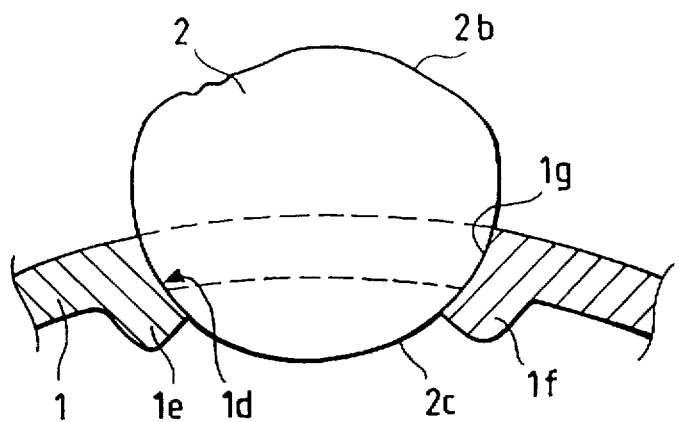
FIG. 4 is a cross-sectional view showing a second example of the shape of the window portion of the retainer applicable to the embodiment of FIG. 1.

Description will now be made of the sprags 2 which are torque transmitting members in the sprag type one-way clutch 10. Each sprag 2, as shown in FIGS. 1 to 4 and 7, is of a cylindrical shape having a portion thereof having a predetermined thickness in the axial direction thereof cut away. As shown in FIGS. 3 and 4, the sprag 2 is provided with a cam portion 2b comprised of an irregular curve having a portion of the circumference thereof broken away when it is seen from the front thereof, and the cam portion 2b is designed to be opposed to and contact with the inner peripheral surface of the outer race 4. The portion opposed to the cam portion 2b of the sprag is a substantially circular portion 2c, which is designed to be opposed to and contact with the outer peripheral raceway surface of the inner race 5.

The circular portion 2c of the sprag 2, as shown in FIGS. 3 and 4, is fitted in the window portion 1d of the retainer 1 for pivotal movement in the circumferential direction thereof. When the sprag 2 pivotally moves in the window portion 1d of the retainer 1, the circular portion 2c of the sprag 2 slidably contacts with the opposed two circumferential edge portions 1e of the window portion 1d. As can be seen from a first example shown in FIG. 3, the circular portion 2c of the sprag 2 is in slidable contact with the circumferential edge portions 1e with a length corresponding substantially to the thickness of the circumferential edge portions 1e of the window portion 1d. Design is made such that the curvature of the circular portion 2c and the curvature of the circumferential edge portions 1e are substantially equal to each other.

Also, the end portions of the opposed two circumferential edge portions 1e of the window portion 1d of the retainer according to a second example shown in FIG. 4 are bent radially inwardly to form bent portions 1f, whereby there can be formed circumferential edge portions 1g longer than the circumferential edge portions 1e shown in FIG. 3. Design is made such that the curvature of the circular portion 2c and the curvature of the circumferential edge portions 1g are substantially equal to each other.

As is apparent from the foregoing description, the sprags 2 are contained in the window portion 1d of the retainer 1 and are designed such that they can pivotally move in the circumferential direction, but hardly pivotally move in the axial direction.

Figure 5:
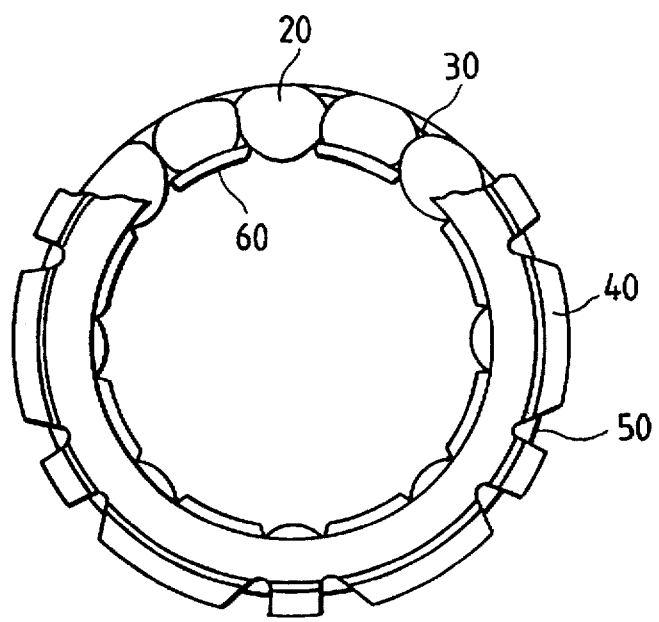
FIG. 5 is an axial front view showing an example of the sprag type one-way clutch according to the prior art.
Figure 6:
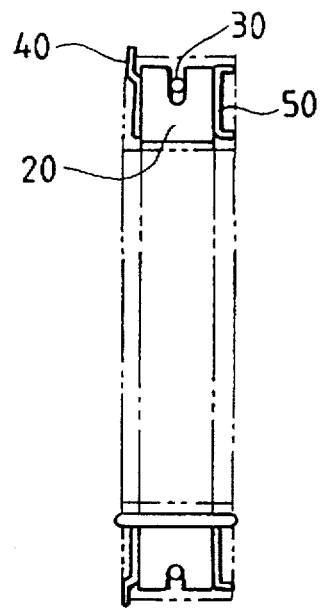
FIG. 6 is a radial cross-sectional view of the sprag type one-way clutch of FIG. 5.

The circumferential edge portions 1e and 1g described above, as compared with the relation between the sprags 20 and the wire cage 60 in FIG. 5 showing the one-way clutch according to the prior art, have the following effect. In FIG. 5, the circular portions of the sprags 20 bear against the wire cage only on a line. In contrast, in FIGS. 3 and 4 which shows the embodiment of the present invention, the sprags 2 contact with the circumferential edge portions 1e and 1g of the window portion 1d of the retainer 1 not on a line, but in face to face contact and therefore, the sprags 2 can smoothly and reliably pivotally move relative to the window portion 1d of the retainer 1. Particularly when design is made as shown in FIG. 4, the slidable contact surface between the circular portions 2c of the sprags 2 and the circumferential edge portions 1e and 1g of the retainer 1 can be increased and therefore, the sprags 2 can more smoothly and reliably pivotally move relative to the window portion 1d of the retainer 1.

In the embodiment shown in FIGS. 3 and 4, the circular portion 2c of the sprag 2 and the circumferential edge portions 1e and 1g of the window portion of the retainer are of shapes complementary to each other. Of course, the circular portion 2c of the sprag 2 need not always be circular, but may by of any other shape which has a smooth curve.

Figure 7:
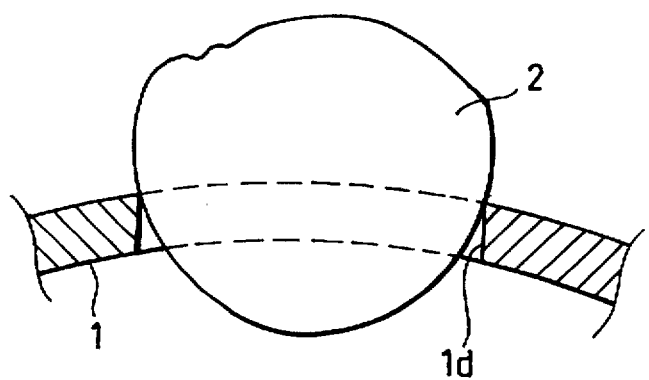
FIG. 7 is a cross-sectional view showing a third example of the shape of the window portion of the retainer applicable to the embodiment of FIG. 1.

Also, of course, in the present embodiment, the object of the present invention is achieved even by a shape in which the window portion 1d of the retainer 1 remains radially punched by press as in a third example shown in FIG. 7.

According to the sprag type one-way clutch of the present invention described above, there are obtained the following effects.

The window portion of the retainer performs the functions of the side plates and the wire cage in the prior art at the same time, and therefore, the number of parts decreases as compared with the prior art.

The retainer is provided with the cylinder portion having a radially extending window portion and the sprags are fitted in the window portion, and the spring is guided by the outer peripheral surface of the cylinder portion. Therefore, the circularity of the spring can be improved and the spring can be guided well by the sprags and the cylinder portion of the retainer to thereby make the biasing force contact. Further, the spring is not deformed and therefore, the durability of the spring is improved and the operation including the meshing operation of the one-way clutch becomes stable.

Also, according to the embodiment, the circumferential portions of the window portion of the retainer are made into a predetermined construction, whereby the pivotal movement of the sprags takes place smoothly and accurately.

What is claimed is:

1. A sprag type one-way clutch comprising:
   an outer race having an annular inner peripheral raceway surface;
   an inner race having an annular outer peripheral raceway surface and disposed in said outer race, said inner race and outer race being radially spaced apart from each other and concentrically disposed for relative rotation;
   a plurality of sprags disposed between said outer and inner races for transmitting a torque between said outer peripheral raceway surface and said inner peripheral raceway surface, each sprag having a groove disposed on a radially outer surface of said sprag and extending through in a circumferential direction;

an annular retainer rockably retaining said sprags, said retainer having a cylindrical portion provided with a plurality of windows radially extending therethrough; and a stretchable annular spring member fitted in said grooves to hold said sprags between itself and said cylindrical portion of said retainer and to bias said sprags in a meshing direction, wherein only one sprag is rockably fitted into each of said Windows, and said spring member is guided in a substantially circular form on an outer peripheral surface of said cylindrical portion of said retainer.

2. A sprag type one-way clutch according to claim 1, wherein said retainer has an annular flange portion extending radially outward from an end of said cylindrical portion, said flange portion having at least one cut-out groove extending radially outward from an adjacent window.

3. A sprag type one-way clutch according to claim 1, wherein edges of each said window which are opposed in a circumferential direction of said retainer engage the corresponding sprag so as to guide the sprag throughout a range of its rocking movement.

4. A sprag type one-way clutch according to claim 3, wherein said edges of each window are of complementary shape to an outer contour of the corresponding sprag, such that said edges guide the rocking movement of the sprag by complementary face-to-face engagement with the sprag.

5. A sprag type one-way clutch according to claim 1, wherein said spring member is a coil spring.

\* \* \* \* \*